United States Patent [19]

Rehrig

[11] Patent Number: 4,555,123
[45] Date of Patent: Nov. 26, 1985

[54] PROTECTIVE FLANGE FOR WHEEL CASTOR HOUSING

[76] Inventor: Houston Rehrig, 4539 Gorham St., Corona Del Mar, Calif. 92625

[21] Appl. No.: 455,739

[22] Filed: Jan. 5, 1983

[51] Int. Cl.⁴ .............................................. B60B 33/00
[52] U.S. Cl. ................. 280/160; 16/18 CG; 280/33.99 C; 293/128
[58] Field of Search ................. 280/33.99 R, 33.99 A, 280/33.99 C, 33.99 S, 153 R, 153 A, 154, 159, 160; 293/126, 127, 128, 48, 58; 16/18 R, 18 CG; 362/376, 61, 74

[56] References Cited

U.S. PATENT DOCUMENTS

| 971,970 | 10/1910 | Campbell | 16/18 CG |
| 2,129,579 | 9/1938 | Herold | 293/58 |
| 2,447,582 | 8/1948 | Klumb | 16/18 CG |
| 2,450,062 | 9/1948 | Voss et al. | 16/18 CG |
| 2,530,053 | 11/1950 | Glass | 280/160 |
| 2,996,752 | 8/1961 | Pope | 293/58 |
| 3,201,139 | 8/1965 | Turlington | 280/33.99 C |
| 3,719,370 | 3/1973 | Gintick et al. | 280/33.99 C |

Primary Examiner—Richard A. Bertsch
Attorney, Agent, or Firm—Banner, Birch, McKie & Beckett

[57] ABSTRACT

A cart having a basket and wheeled frame with a pair of flared protective flanges. The protective flanges attach to the lower section of the wheeled frame and extend rearwardly, downwardly and laterally outwardly to prevent the rear wheel castors of the cart from inadvertently causing damage to adjacent objects during routine use and to shield the rear wheel castors of the cart from lateral and upwardly directed impacts.

2 Claims, 3 Drawing Figures

PROTECTIVE FLANGE FOR WHEEL CASTOR HOUSING

BACKGROUND OF THE INVENTION

This invention relates generally to the field of carts, particularly those carts that are used in supermarket and grocery stores, and is directed to a new and novel cart having flared protective flanges around the wheel castor housings to prevent inadvertent damage to surrounding objects and to the wheel castors themselves.

Ideally, carts of the type used in supermarkets and the like should stand up to heavy use and should be easy to push and to maneuver. The condition of the wheel castors have a great impact in this regard. The carts should also be designed to prevent inadvertent damage to other adjacent structures and objects which the cart is required to maneuver around.

Carts of the prior art are usually comprised of a wheeled tubular metal frame to which is attached a basket of open wirework or plastic construction. Much has been done to improve the maneuverability of carts of the prior art and to make them less prone to damage and abuse. Many of these improvements have been directed toward the basket portion of the cart. See, for example, applicant's U.S. Pat. No. 3,999,774 and 4,273,346. While the improvements typified by these patents have resulted in carts that are far superior to those previously known in the art, these carts remain somewhat deficient in the area of the wheel castors.

Carts of the prior art usually have a plurality of castors supporting the cart frame. The exposed nature of these castors makes them subject to continuous impact with other adjacent carts and stationary objects, often causing damage to the carts and objects impacted. The problem is aggravated when the cart is used in conjected and close quarters, as for example, in crowded supermarkets where the cart must be maneuvered around closely spaced gondolas of merchandise and other carts. The edges of the wheel castor housings often scrape and gouge the gondolas, particularly when the cart is turning around a corner. An accumuation of such impacts can lead to such a deterioration of the gondolas that they must be replaced. Because the edges of the rear wheel castor housings in most carts of the prior art extend outward of the main body of the cart, the rear castors are particularly likely to cause this kind of damage.

Apart from causing inadvertent damage to other adjacent carts and stationary objects, the wheel castors are themselves susceptible to being damaged. The rear castors are particularly at risk because they usually are not permitted to swivel as are the front castors. Thus, when impacted, rather than rotate with the force, the rear castors must often absorb the full blunt of the impact, thereby increasing the likelihood that they will be damaged.

In conventional shopping carts, the rear wheel castors are usually riveted to the cart frame to provide the requisite integrity for strength and rigidity of the entire wheeled frame. The rear castors are, therefore, difficult to replace when they become damaged. Rather than replace damaged castors, the cart is often discarded altogether or allowed to remain in service to the agrravation and consternation of the user.

Impacts to the side and rear of the rear wheel castors are not the sole source of concern. The castors are often damaged when the cart is pushed up over a curb, e.g., in front of a supermarket. The rear castors have a tendency to catch on the edge of the curb and can easily become damaged.

Accordingly, there is a need in the art for a cart having means to prevent the rear wheel castors from causing inadvertent damage to surrounding objects and from themselves being easily damaged during routine use.

SUMMARY OF THE INVENTION

It is the overall object of this invention to provide a new and improved cart which overcomes the disadvantages of carts known in the prior art.

A specific object of this invention is to provide a new and improved cart that is easy to push and to maneuver.

Another specific object of this invention is to provide a cart that is less likely to cause damage to adjacent objects.

Another specific object of this invention is to provide a cart that is less susceptible to damage to its rear wheel castors than carts of the prior art.

A still further object of this invention is to provide a cart having the above advantages which is light in weight.

A further object of the invention is to provide a cart that is easier to maneuver over rough and uneven surfaces than carts of the prior art.

This invention comprises a cart having a conventional frame and basket. The basket can be of open wirework or plastic construction as is known in the art. The frame may be primarily of tubular construction and is comprised of a lower section supported on four wheel castors. The rear portion of the frame is identified by a pair of adjacent corners.

The key feature of this invention is that the lower section of the cart frame includes a pair of flared protective flanges that extend rearwardly, downwardly and laterally outwardly in front of the rear wheel castors. The flared flanges serve a three-fold purpose. First, the flanges prevent the wheel castor housings fromm damaging adjacent objects. Second, the flanges protect the rear castors from lateral impacts. And, third, the flanges offer a measure of protection for the rear castors when the cart is pushed over an uneven surface, e.g., over a curb. Thus, the effects of upwardly directed forces on the castors are significantly reduced.

DESCRIPTION OF THE PREFERRED EMBODIMENT

Figure 1:
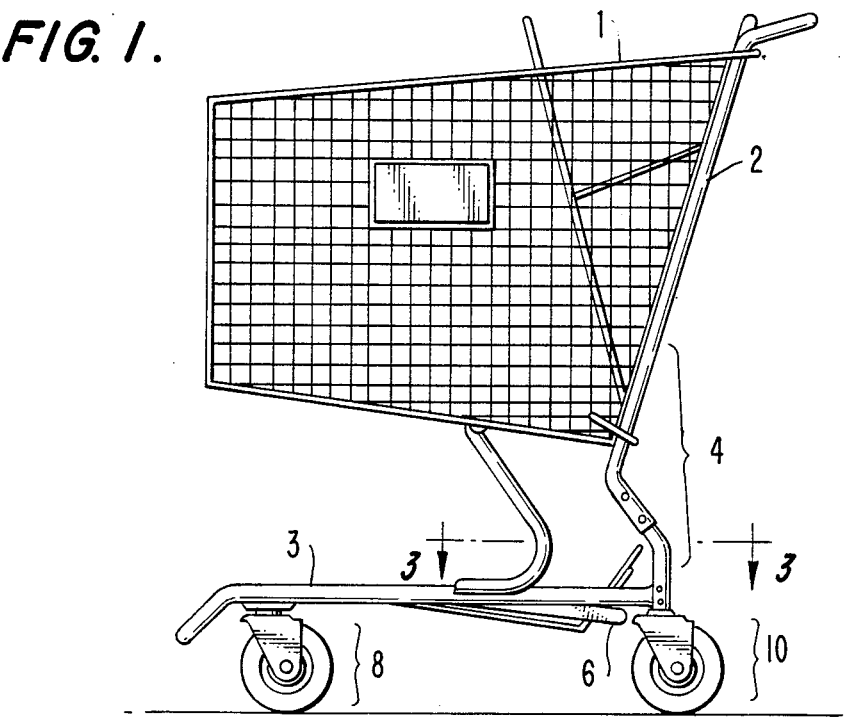
FIG. 1 is a side elevational view of the cart showing one of the flared protective flanges.

As shown in FIG. 1, the cart which is the subject of this invention is comprised of basket 1 and frame 2. Basket 1 is of conventional design and may be manufactured of open wirework or plastic construction. For example, the baskets shown in applicant's U.S. Pat. Nos. 3,999,774 and 4,273,346 could be employed. Baskets made of polyethylene material are ideally suited for this application, as polyethylene is light weight and is relatively strong while at the same time being flexible enough to absorb some deformation, such as caused by impacts, without breaking. Frame 2 is also of conventional design and may be of tubular construction. For example, the frame shown in applicant's U.S. Pat. Nos. 3,999,774 and 4,273,346 could be employed.

Frame 2 comprises lower horizontal section 3 to which is attached castor 8 at the front of the cart and castor 10 at the rear, adjacent corner 4. Also attached to the lower horizontal section 3 is flared protective flange 6. A second protective flange is attached to lower horizontal section 3 on the other side of frame 2 to protect the rear wheel castor on that side of the frame.

Figure 2:
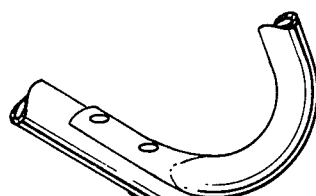
FIG. 2 is a rear corner perspective view of the cart showing the flared protective flanges of FIG. 1 in more detail.

Protective flange 6 may be constructed of bar stock as shown in FIG. 2 or may be of tubular or like construction. As illustrated in FIG. 2, flange 6 attach to lower horizontal section 3 sufficiently forward of rear castor 10, respectively, to permit flange 6 to extend rearwardly, downwardly and laterally outward with respect to lower horizontal section 3 and wheel housings 12. Flange 6 may be attached to section 3 by any conventional fastening means, including welding, rivets and nuts and bolts.

Flange 6 should also be sufficiently sloped downwardly to permit their bottom rearward edges to fall below the top portion of wheel housing 12, as indicated by dashed line 14 in FIG. 2. Sloping flange 6 in this manner significantly reduces the potential of damage to the rear wheels and wheel housings when pushing the cart over or onto an uneven surface. For example, when pushing the cart up over a curb in front of a supermarket, there is a tendency of the user not to lift the rear of the cart high enough to prevent the rear castor housings from catching on the edge of the curb. This can, and often does, lead to the rear castors being damaged. Flange 6 however, precludes this from occurring. As the cart is moved onto the curb, flange 6 prevents the rear wheel housings from ever catching on the edge of the curb. Thus, at most, the curb edge engages the rolling surface of the rear wheels without corresponding damage.

Figure 3:
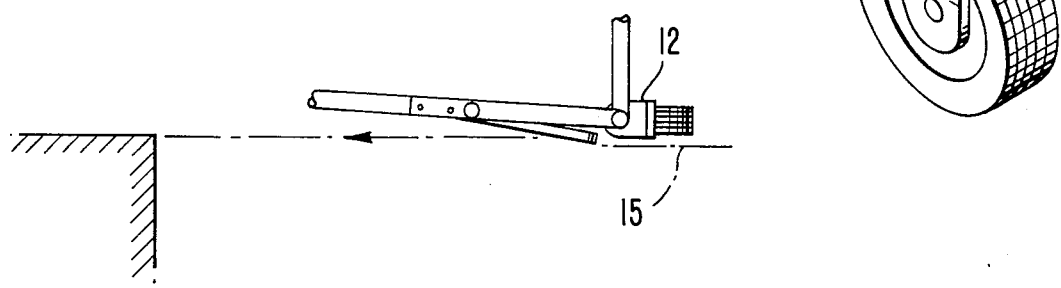
FIG. 3 is a horizontal cross-sectional view taken along the plane of line 3—3 in FIG. 1 and showing the flared protective flange of FIG. 1.

Flange 6 is also sufficiently extended laterally and outwardly as shown in FIG. 3 such that the rear portion of the flanges extend beyond the outside edge of wheel housings 12 and 13 as indicated by dashed line 15. Thus, the rear castor housings are prevented from causing damage to adjacent structures. The castors are also substantially protected from lateral impacts to the lower portion of the cart.

It is clear from the foregoing description that many modifications to the above-described preferred embodiments will become apparent to those of ordinary skill in the art from a reading of this disclosre. It should be realized that the invention is not limited to the particular apparatus disclosed, but its scope is intended to be governed only by the scope of the appended claims.

I claim:

1. A wheeled cart comprising:
  a frame having two corners;
  a pair of wheels connected to and extending downwardly from said frame adjacent said corners; and
  flange means for each wheel of said pair of wheels connected to said frame for protecting said wheels, each of said flanges being located adjacent its respective wheel and extending rearwardly with respect to said cart and downwardly and laterally outwardly with respect to said frame to prevent said wheels from damaging adjacent objects and to shield said wheel from lateral and upwardly directed impacts, wherein said flange means is attached to said frame in a manner that prevents said flange means from damaging adjacent objects due to impacts with said cart.

2. In a movable cart having a basket mounted on a base assembly and at least one castor wheel attached to said base assembly, an improvement comprising:
  flange means attached to said base assembly for preventing said castor wheel from damaging adjacent objects due to impact with said cart and for shielding said castor wheel from upwardly directed impacts, wherein said flange means is attached to said base assembly in a manner that prevents said flange means from damaging adjacent objects due to impacts with said cart, wherein said flange means comprises a bar located adjacent said wheel and extending rearwardly with respect to said cart and downwardly and laterally outwardly with respect to said base assembly.

* * * * *